Aug. 30, 1932.  F. S. CASSE  1,874,898
KITCHEN UTENSIL
Filed Sept. 8, 1930
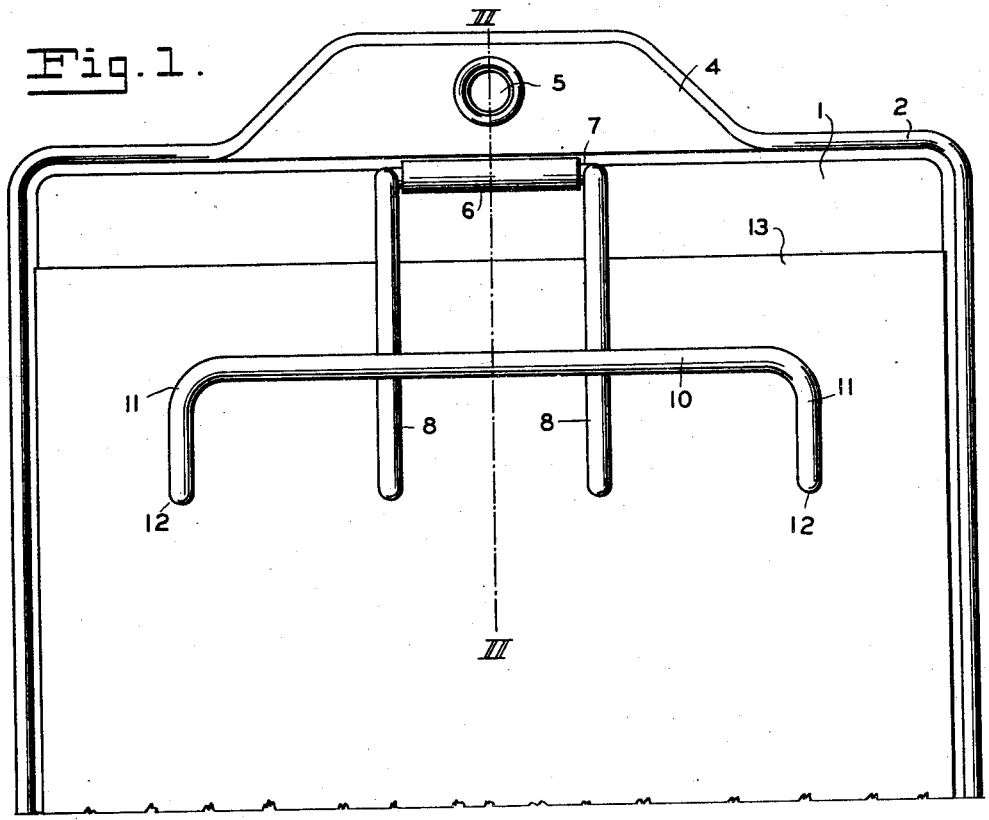
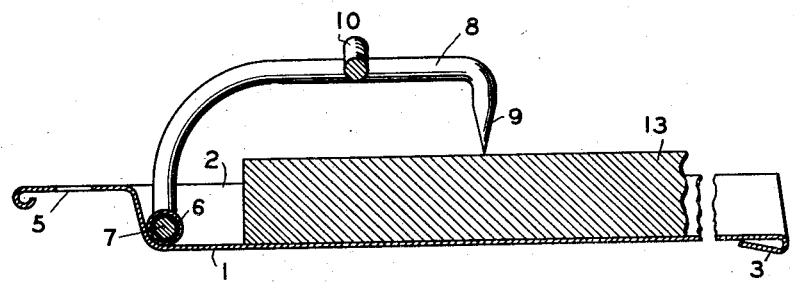
INVENTOR:
FREDERICK S. CASSE
BY Baldwin Vale
ATTORNEY.

Patented Aug. 30, 1932

1,874,898

UNITED STATES PATENT OFFICE

FREDERICK S. CASSE, OF SAN FRANCISCO, CALIFORNIA

KITCHEN UTENSIL

Application filed September 8, 1930. Serial No. 480,457.

This invention relates to improvements in kitchen utensils and more particularly to meat holders.

The principal object of the invention is to provide means for holding meat while it is being scraped or sliced.

Another object is to conserve the juices of the meat and to securely hold it while it is being scraped.

A further object is to combine several kitchen utilities into a compact assembly.

Other objects and advantages will appear as this description progresses.

In this specification and the annexed drawing the invention is disclosed in its preferred form. But it is to be understood that it is not limited to this form because it may be embodied in other forms. It is also to be understood that in and by the claims following the description it is desired to cover the invention in whatsoever form it may be embodied.

This invention is especially useful for holding raw meat while it is being scraped. Scraped raw meat is often indicated in the diet of invalids, and is a tedious operation to prepare without the aid of this invention.

In the one sheet of drawing:

Fig. 1 is a plan view from above of a meat holder constructed and arranged in accordance with this invention.

Fig. 2 is a side view of the same in longitudinal section on the line II—II, of Fig. 1.

In detail the construction illustrated in the drawing comprises the metal tray or base 1, having the upturned flange 2, on three of its edges, with the edge of one of its ends turned under as at 3. The opposite end has the central extension 4 to form a convenient handle, centrally perforated as at 5, so that the tray may be hung up.

The edges of the tray are curled under as at 3—3 to protect the hands of the user from the raw edges of the "tin" of which the tray is composed.

The strap 6 is spot welded or soldered to the tray to form a pivot sleeve at the upper end of the tray 1.

The meat holding clamp or fork comprises a center loop 7 of heavy wire passing through and pivotal in the sleeve 6. The extensions 8—8 of the loop extend forward over the tray and have the sharpened ends 9—9 bent downward toward and adapted to rest upon the plane of the tray 1.

The transverse bar 10 lies across and is welded to the extensions 8—8, and is bent at 11—11, parallel with the extensions 8—8. The sharpened ends 12—12 are spaced from and alined with the similar ends 9—9.

The slice of steak to be scraped is laid on the tray 1 and the fork dropped into position so that the ends 9–12 impale the meat. The operator presses down on the fork with one hand while scraping the surface of the meat with the other, in the usual manner.

The juices squeezed from the meat accumulate in the tray and are not lost, as occurs when the meat is scraped on a table or board, as has been common practice heretofore.

This invention is also very useful in slicing raw, cooked and smoked meats. In diet kitchens, and apartment kitchenettes it is difficult to hold a small piece of meat so that it can be neatly sliced thin. To facilitate this operation the board 13 is provided. It fits snugly between the flanges 2 and beneath the fork points which are adapted to impale the meat resting upon the board. Such a board is generally useful in a kitchen. The tray 1 could be dispensed with and the fork pivoted directly to the board.

For further particulars regarding meat scrapers and scraped meat for dietetic purposes, see my copending application filed May 19, 1930, Serial Number 453,615, entitled Scraper.

Having thus described this invention, what I claim and desire to secure by Letters Patent is:

1. A meat holder comprising a base, a fork pivoted on said base and having sharpened ends bent toward said base, and a transverse bar fixed to said fork and having downturned sharpened ends spaced from the ends of said fork.

2. A meat holder comprising a base, a fork having a center loop pivoted to said base and having two longitudinally extending arms with sharpened ends bent toward said base, and a transverse bar fixed to said fork and having downturned sharpened ends in line with the ends of said fork.

3. A meat holder comprising a sheet metal base having upturned flanges on three of its sides, a fork pivoted to said base and having sharpened ends bent toward said base, a transverse bar fixed to said fork and having downturned sharpened ends spaced from the ends of said fork, and a board interposed between said base and fork.

4. A meat holder comprising a sheet metal base having upturned flanges on three of its sides, a strap fixed to said base, a fork having a center loop pivoted in said strap and having arms extending upwardly and longitudinally with sharpened ends bent down toward said base, a transverse bar fixed to said fork and having downturned sharpened ends in line with the ends of said fork, and a board interposed between said base and fork between said flanges.

In testimony whereof I have hereunto set my hand this 27th day of August, 1930.

FREDERICK S. CASSE.